Nov. 22, 1932.   A. E. W. JOHNSON ET AL   1,888,504
POWER DRIVEN POTATO DIGGER
Filed Feb. 9, 1931   3 Sheets-Sheet 3
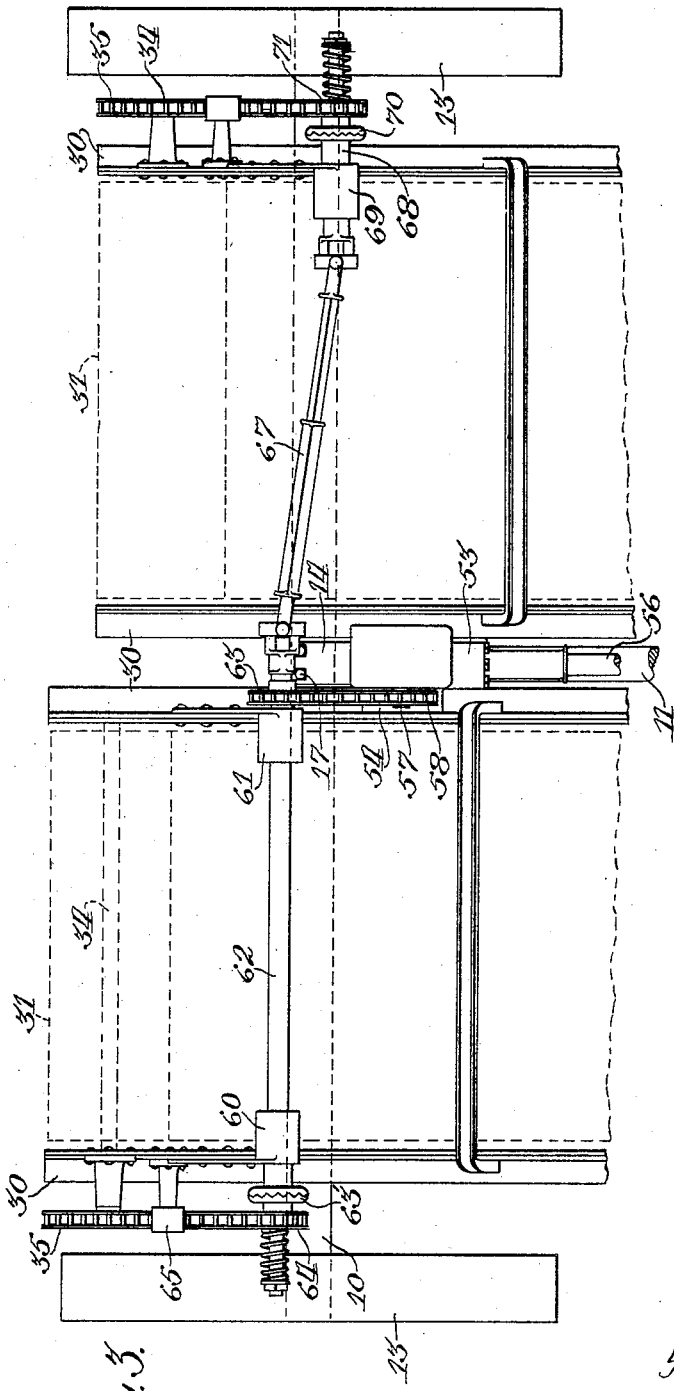
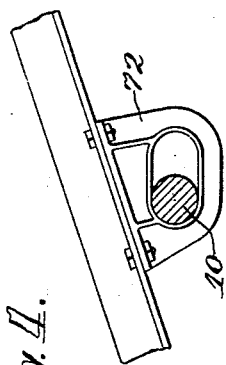
Inventors
Arnold E. W. Johnson
and William C. Dwyer
By H. P. Doolittle
Atty.

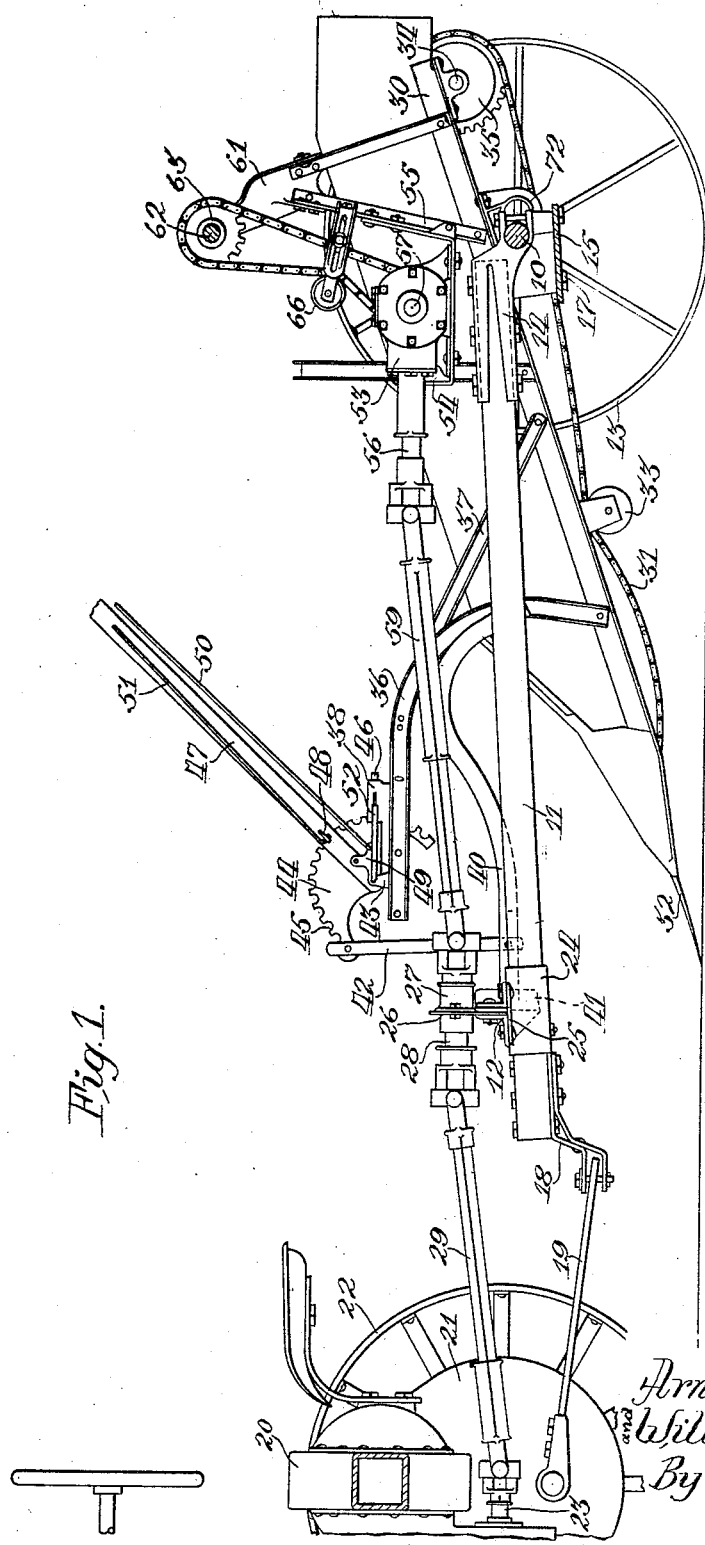

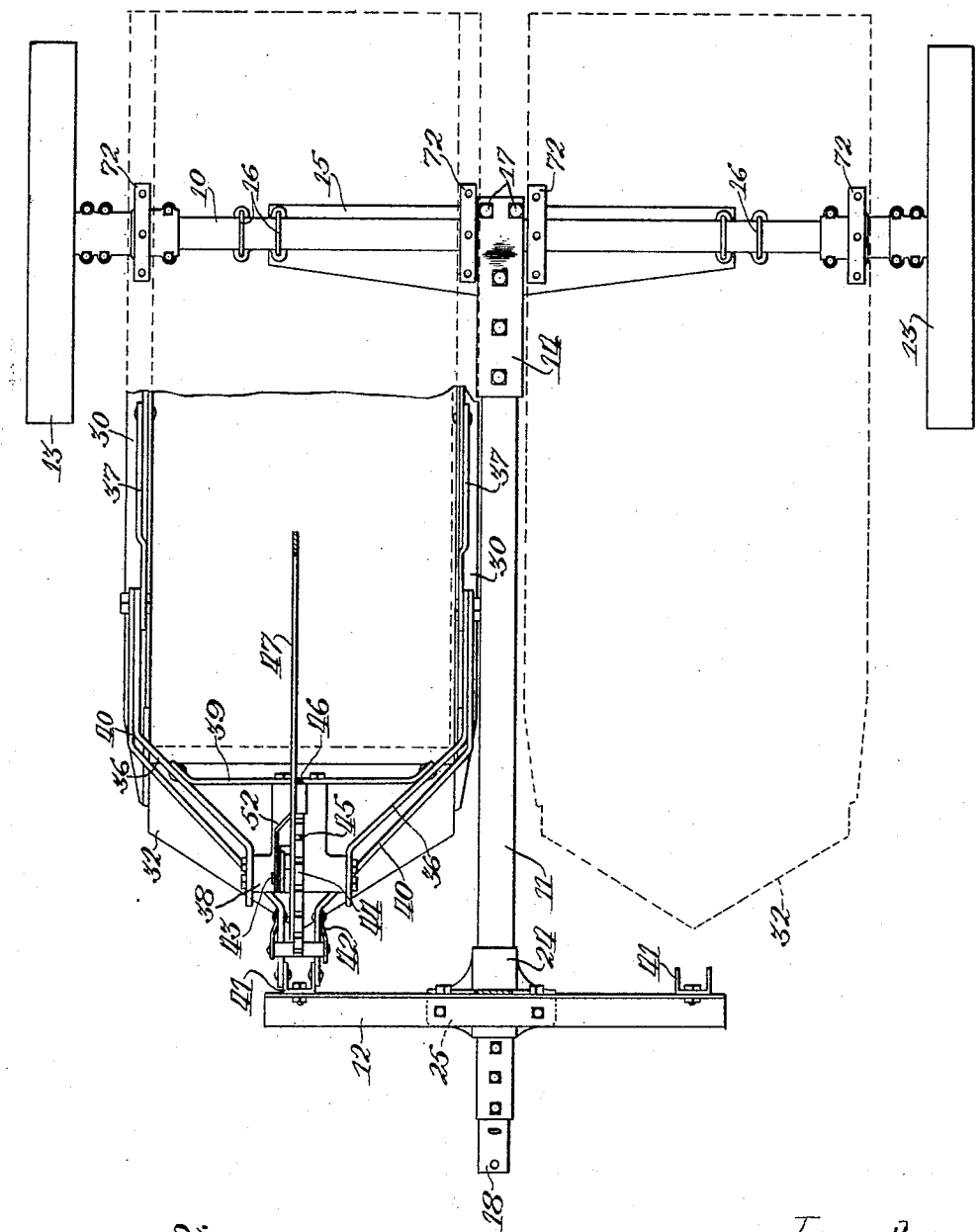

Patented Nov. 22, 1932

1,888,504

UNITED STATES PATENT OFFICE

ARNOLD E. W. JOHNSON, OF CHICAGO, ILLINOIS, AND WILLIAM C. DWYER, OF AUBURN, NEW YORK, ASSIGNORS TO INTERNATIONAL HARVESTER COMPANY, A CORPORATION OF NEW JERSEY

POWER DRIVEN POTATO DIGGER

Application filed February 9, 1931. Serial No. 514,422.

This invention relates to a potato digger. More specifically it relates to mechanisms for adjustably mounting and for driving the units of a multiple row digger.

The principal object of the invention is to provide a suitable supporting structure and to provide means for adjustably mounting the individual units thereon.

Another main object is to provide driving means for the mechanisms of the digger units constructed to be operated from a tractor power take-off. These objects and others which will be apparent, are accomplished by the frame structure and the flexible driving means shown in the embodiment of the invention illustrated in the drawings, in which:

Figure 1 is a vertical section taken longitudinally through the digger at one side of the center;

Figure 2 is a plan view showing the supporting structure for the digger units and the forward portion of one of the units;

Figure 3 is a plan view of the rear portion of the digger, illustrating the flexible feature of the drive mechanisms; and Figure 4 is an enlarged detailed view, showing one of the mounting brackets for the digger units on the axle.

The supporting frame structure consists of a transversely extending axle 10, a central, forwardly extending member 11, and a transversely extending bar 12 positioned at the forward end of the member 11. Supporting wheels 13 are rotatably mounted at the ends of the axle 10. The central member 11 is rigidly secured to a casting 14 by a plurality of bolts extending through the member and through the casting. The casting 14 is provided with lateral extensions 15, which extend under the axle 10. U-bolts 16 rigidly secure the extensions 15 to the axle. The central member 11 and the axle 10, rigidly secured together by the casting 14, provide a T-shaped frame structure on which the digger units are mounted, as will be hereinafter described. The casting 14 is additionally secured to the axle 10 by clamp bolts 17. The member 11 is tubular in form and of a substantial diameter, forming thereby a strong central support. At the forward end of the member 11, bars 18 are secured thereto and shaped to form a clevis which is adapted to be secured to the drawbar 19 of a tractor.

The tractor is of a well known type, having an arched rear axle consisting of an axle housing 20 and downwardly depending housings 21 on which the wheels 22 are mounted. The drawbar 19 is mounted on the lower portion of the housings 21. A power take-off shaft 23 extends rearwardly beneath the axle housing 20 and drives the mechanisms to the digger, as will be hereinafter described.

At the forward end of the member 11 a casting 24, the body portion of which is cylindrical, is fitted over the member 11 and rigidly secured thereto. The casting 24 is provided with horizontal extensions 25 and a vertical extension 26. The angle bar 12 is rigidly secured to the extensions 25 and 26 in a horizontal position.

The upper portion of the extension 26 is provided with an opening through which a bearing member 27 extends. Said member is rigidly secured to said extension. A shaft 28 is rotatably mounted in the bearing member 27. A driving shaft 29, splined or formed in two sections axially slidable with respect to each other, is connected by universal joints to the power take-off shaft 23 and to the shaft 28 for driving the digger mechanisms, as will be described.

Each of the digger units is provided with a frame, two essential elements of which are the downwardly extending angle bars 30. Said bars are spaced apart a sufficient distance to provide for the operation of shaking chains 31 therebetween. At the forward end of the bars 30, which are substantially parallel, a digging blade 32 is mounted. The shaking chain 31 is suitably mounted over drive sprockets or agitator rollers such as the roller 33 illustrated. The digger blade and the shaking chain may be of any well known construction. At the rear of the member 30 a shaft 34 carries sprockets 35 which drive the shaker chain. As shown in Figure 3, the shaft 34 on each unit extends laterally beyond the digger frame and is provided with a sprocket 35 to provide driving means.

To provide for supporting the digger frames, upwardly and forwardly extending draft bars 36 are secured to the side bars 30 of the digger frames and are braced by bars 37 connected to the draft bars and to rearwardly located points on the bars 30. The bars 36 extend centrally inwardly, as shown in Figure 2, and are rigidly secured to a member 38. A cross bar 39 is connected to the bars 36 and to rearward extensions on the member 38, to form a rigid construction. Draft beams 40, pivotally secured to the downwardly extending portions of the bars 36, extend forwardly and inwardly and are pivotally connected to a bracket 41 secured to the end of the bar 12. Adjacent the forward ends of the beams 40 upwardly extending links 42 are pivotally attached. At their upper ends the links are pivotally attached to a transverse portion of a member 44, shaped as a sector and provided with notches 45. The member 44 is pivotally mounted on a transverse axis on an upstanding portion of the member 43, which is a part of member 38. A latch means 46 is also mounted in a portion of the member 38 and is adapted to engage the notches 45. A hand lever 47, pivotally mounted on the same axis as the member 44, is provided with a latch 48 adapted to engage the notches 45. A member 49, pivoted on the lever 47, is adapted to be manually operated by a rod 50 extending along the lever. The latch 48 is also operated by a small rod 51, extending along the lever. The member 49 has an integral forward extension to which a member 52 is pivotally attached on an axis, the same as the axis of the member 44. The member 52 extends rearwardly and is adapted to operate the latch 46.

On one of the digger frames at the inner side thereof a gear case 53 is mounted on a supporting bracket 54, which is rigidly secured to an upwardly extending angle bar 55 and to other portions of the digger frame. The gear casing 53 contains suitable gears for transmitting power from a horizontally positioned forwardly extending shaft 56 to a transversely extending shaft 57 on which a chain sprocket 58 is mounted. A splined shaft 59, the two sections of which are axially slidable with respect to each other, is connected by universal joints to the shaft 56 and to the shaft 28.

Bearing brackets 60 and 61, mounted above the digger frame, on which the gear casing 53 is mounted, provide means for rotatably mounting a transversely rotating shaft 62. At the inner side of this digger unit the shaft 62 is provided with a chain sprocket 63, positioned in alignment with the chain sprocket 58 and driven by a chain therefrom. At the outer side of the digger unit the shaft 62 is provided with a slip clutch 63', through which power is transmitted to a chain sprocket 64. The chain sprocket 64 is mounted in alignment with the chain sprocket 35 and drives said sprocket by means of a chain. An idler pulley 65 is provided for maintaining the chain at the proper tightness. An idler pulley 66 is also provided for maintaining the chain for driving the shaft 62 at the proper tightness. At the center of the digger between the two units the shaft 62 extends beyond the sprocket 63 and is connected by means of a universal joint to a splined shaft 67. The splined shaft 67 is constructed in two sections to provide for axial movement and a variation in length. A shaft 68 is mounted at the outer side of the second digger unit in a bearing bracket 69. The shaft 68 is connected to the shaft 67 by means of a universal joint.

Through a slip clutch 70 the said shaft drives a chain sprocket 71, positioned in alignment with the chain sprocket 35 on said digger unit and drives said sprocket by means of a chain.

The elements making up means for mounting and adjusting the position of the forward end of the digger units have been fully described. At the rear of the digger units brackets 72 are secured to the bars 30 of the digger frame. Said brackets are provided with horizontally extending slots through which the axle 10 extends.

In the operation of the digger as above described, power is applied through the power take-off shaft 23 to the shaft 29 and is transmitted through the shafts 28, 59 and 56 to the gearing in the gear case 53. From said gearing power is transmitted through the shaft 57 to the shaft 62 by means of the sprockets mounted thereon and the driving chains. From the shaft 62 power is transmitted to the shaft 34 through the chain sprockets 35 and 64 and the driving chain surrounding said sprockets. The shaft 62 also drives the shaft 67 which, through the shaft 68, operates the mechanism on the second digger unit. The splined shaft 29 provides for drawing of the tractor with respect to the digger unit by axial sliding of the sections making up said shaft. The splined shaft 59 is so constructed to provide for vertical adjustment of the digger unit without interfering with the driving means. The splined shaft 67 is so constructed to provide for relative movement of the digger units without interfering with the driving connections across the top thereof, as illustrated and described. In Figure 3 the digger units have been shown in different angular positions to illustrate the functioning of the splined shaft 67 as connected by universal joints to the shafts 62 and 68. The forwardly mounted depth adjusting means are utilized to alter the penetrating depth of the digging blade 32. By tension on the rod 50 the latch 46 is disengaged from the notches 45. The tension on the rod 51 disengages the latch 48. The lever 47 may then be moved to any angular position around the sector 44. The latch 48 is again engaged, thereby locking the lever 47 with respect to the sector 44. Said sector may then be rotated about its pivot by applying pressure to the lever. By such movement the forward end of the construction, including the bars 36 and the member 38, is moved vertically as the links 42, which are secured to the draft beams 40, have relatively little vertical displacement. With such movement the forward end of the digger unit is adjusted vertically, pivoting about the axle 10. The slots in the brackets 72 provide for the slight sliding movement necessary due to the fact that the draft beams 40 are connected to the digger frame and to a rigid part of the frame structure of the digger.

It is to be understood that applicants have shown only a preferred embodiment of their improved potato digger construction and that they claim as their invention all modifications falling within the scope of the appended claims.

What is claimed is:

1. A potato digger comprising a frame structure, digger units pivotally and slidably mounted at the rear of the frame structure, means for attaching the forward ends of the units to the frame structure, a driving shaft rotatably mounted at the forward end of the frame structure, a gear case mounted on one of the units, a driving shaft forwardly extending from said case, a splined shaft connected by universal joints to said shaft and to the shaft mounted on the frame structure, a transverse shaft mounted above the unit which carries the gear case, means for driving said shaft from the mechanism contained in said gear case, means for driving the digger mechanism on said unit from said shaft, a shaft rotatably mounted on the second unit, and means for driving said shaft from the transverse shaft on the first named unit consisting of a splined shaft connected by universal joints to said shafts, and means for driving the mechanism on the second unit from the shaft mounted thereon.

2. A potato digger comprising an axle, a forwardly extending member centrally and rigidly secured to said axle, a transverse member rigidly attached at the forward end of the central member, means for mounting said forward end on the drawbar of a tractor, digger units pivotally and slidably mounted on the axle at opposite sides of the central member, vertically adjustable means for attaching the forward ends of the units to the transverse member, a driving shaft rotatably mounted at the forward end of the central member adjacent the transverse member, a gear case mounted on one of the units, a driving shaft forwardly extending from said case, a splined shaft connected by universal joints to said shaft and to the shaft mounted on the central member, a transverse shaft mounted above the unit which carries the gear case, means for driving said shaft from the mechanism contained in said gear case, means for driving the digger mechanism on said unit from said shaft, a shaft rotatably mounted on the second unit, and means for driving said shaft from the transverse shaft on the first named unit consisting of a splined shaft connected by universal joints to said shafts, and means for driving the mechanism on the second unit from the shaft mounted thereon.

3. In a potato digger, the combination with the frame structure thereof of digger units pivotally mounted at the rear of the frame structure and independently adjustably attached at the front of the frame structure and having potato harvesting mechanisms associated therewith, a driving mechanism comprising a shaft rotatably mounted on the frame structure, a shaft rotatably mounted on one of the units, means for operatively connecting said shafts, means operatively connecting the shaft on the digger unit to the mechanism associated therewith, a shaft mounted on the second unit adapted to drive the mechanism associated therewith, and means for operatively connecting said shaft to the shaft mounted on the first named unit, the connecting means between the shafts being flexible to provide for relative movement of the digger units with respect to each other and with respect to the frame structure.

4. In a potato digger, the combination with the frame structure thereof of digger units pivotally mounted at the rear of the frame structure and independently adjustably attached at the front of the frame structure and having potato harvesting mechanisms associated therewith, a driving mechanism comprising a shaft rotatably mounted on the frame structure, a shaft rotatably mounted on one of the units, means for operatively connecting said shafts, means operatively connecting the shaft on the digger unit to the mechanism associated therewith, a shaft mounted on the second unit adapted to drive the mechanism associated therewith, and means for operatively connecting said shaft to the shaft mounted on the first named unit, said means consisting of splined shafts carrying universal joints at the connecting ends thereof.

In testimony whereof we affix our signatures.

ARNOLD E. W. JOHNSON.
WILLIAM C. DWYER.